(12) United States Patent
Nishimura et al.

(10) Patent No.: US 11,325,485 B2
(45) Date of Patent: May 10, 2022

(54) COIL DEVICE

(71) Applicant: IHI CORPORATION, Tokyo (JP)

(72) Inventors: Kenji Nishimura, Tokyo (JP); Seishiro Nakajima, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/642,758

(22) PCT Filed: Oct. 18, 2018

(86) PCT No.: PCT/JP2018/038874
§ 371 (c)(1),
(2) Date: Feb. 27, 2020

(87) PCT Pub. No.: WO2019/078306
PCT Pub. Date: Apr. 25, 2019

(65) Prior Publication Data
US 2020/0180447 A1    Jun. 11, 2020

(30) Foreign Application Priority Data

Oct. 19, 2017 (JP) .............................. JP2017-202401

(51) Int. Cl.
*H02J 50/90* (2016.01)
*B60L 53/126* (2019.01)
*H02J 50/12* (2016.01)

(52) U.S. Cl.
CPC ............ *B60L 53/126* (2019.02); *H02J 50/12* (2016.02); *H02J 50/90* (2016.02)

(58) Field of Classification Search
CPC ........................................................ H02J 50/90
See application file for complete search history.

(56) References Cited

U.S. PATENT DOCUMENTS

| | | | |
|---|---|---|---|
| 2013/0037365 A1 | 2/2013 | Ichikawa | |
| 2013/0335015 A1 | 12/2013 | Ichikawa et al. | |
| 2014/0092236 A1 | 4/2014 | Findeisen et al. | |
| 2014/0132208 A1* | 5/2014 | Fisher ................... | B62D 15/029 |
| | | | 320/108 |
| 2015/0306966 A1 | 10/2015 | Ichikawa | |
| 2016/0288665 A1 | 10/2016 | Tsukamoto | |
| 2017/0132960 A1* | 5/2017 | Kis-Benedek Pinero | ................... |
| | | | G06F 1/1637 |

FOREIGN PATENT DOCUMENTS

| | | |
|---|---|---|
| JP | 09-182212 A | 7/1997 |
| JP | 2011-254633 A | 12/2011 |
| JP | 2012-188116 A | 10/2012 |
| JP | 2013-207984 A | 10/2013 |

(Continued)

*Primary Examiner* — Daniel Kessie
(74) *Attorney, Agent, or Firm* — Volpe Koenig

(57) ABSTRACT

A ground-side coil device includes a ground-side coil disposed on a road surface where a vehicle parks or stops and transmitting or receiving, via a magnetic field, electric power to or from a vehicle-side coil mounted on the vehicle, a position detection sensor disposed around the ground-side coil and acquiring information relating to the position, relative to the ground-side coil, of the vehicle approaching the ground-side coil, a screen disposed at a position visible to a driver of the vehicle approaching the ground-side coil, and a control unit controlling a display mode on the screen.

12 Claims, 8 Drawing Sheets

(56) References Cited

FOREIGN PATENT DOCUMENTS

| | | | |
|---|---|---|---|
| JP | 2013-207999 | A | 10/2013 |
| JP | 2013-258881 | A | 12/2013 |
| JP | 5591283 | B2 | 9/2014 |
| JP | 5751383 | B1 | 7/2015 |
| JP | 2015-230681 | A | 12/2015 |
| JP | 2017-093155 | A | 5/2017 |
| WO | 2013/145581 | A1 | 10/2013 |
| WO | 2013/146139 | A1 | 10/2013 |
| WO | 2014/157094 | A1 | 10/2014 |

* cited by examiner

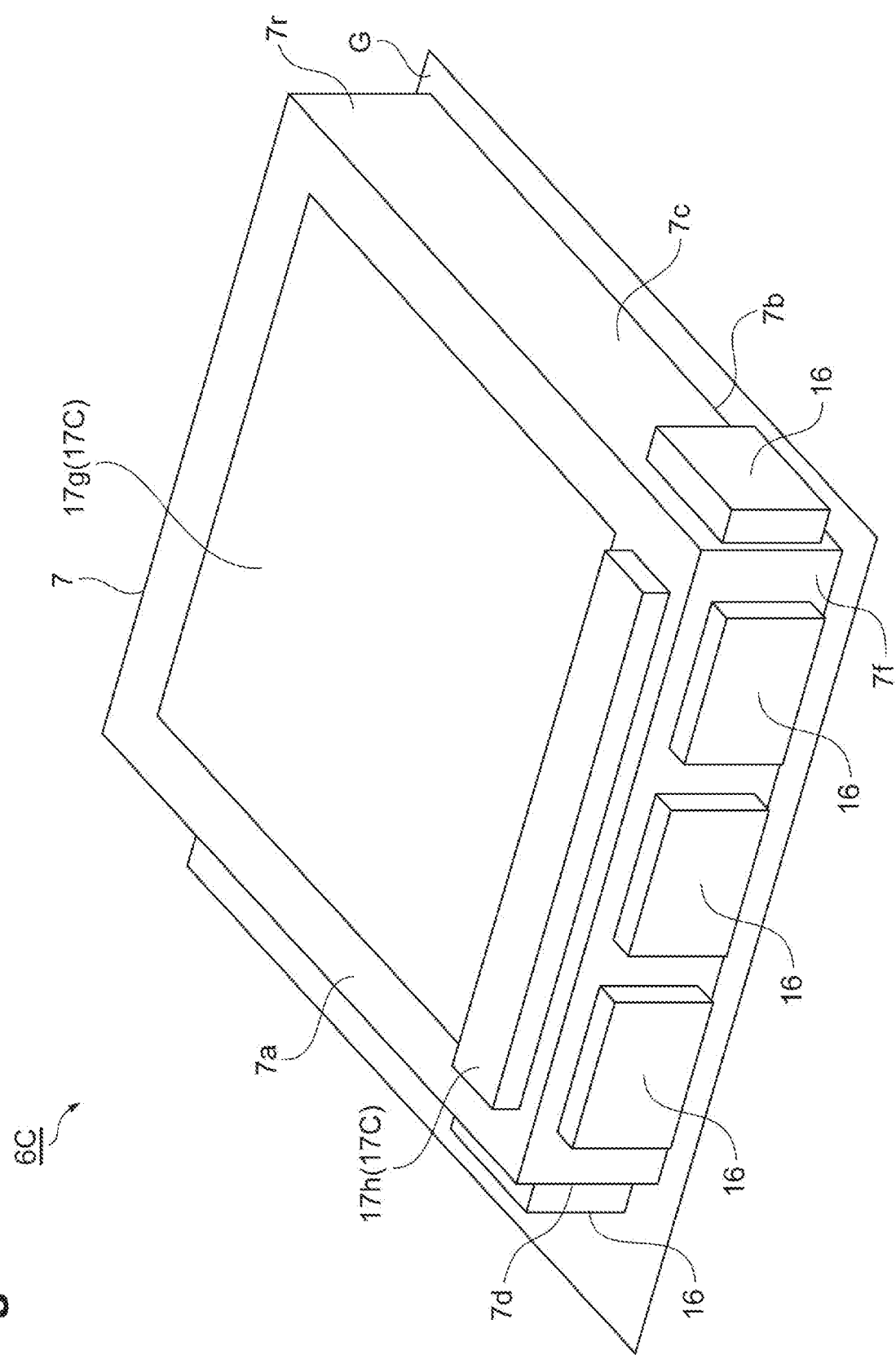

COIL DEVICE

CROSS REFERENCE TO RELATED APPLICATION

This application is a national stage entry of International Patent Application No. PCT/JP2018/038874 filed on Oct. 18, 2018 and claims the benefit of priority of Japanese Patent Application No. 2017-202401 filed Oct. 19, 2017, the contents of which are all incorporated herein by reference in their entirety.

TECHNICAL FIELD

The present disclosure relates to a coil device.

BACKGROUND ART

A wireless power supply system provides electric power from a ground-side device to a vehicle-side device by using a magnetic field. It is desirable that the position of the vehicle-side device relative to the ground-side device is within a predetermined range so that electric power transmission and reception are efficiently performed between the ground-side device and the vehicle-side device. The position of the vehicle-side device relative to the ground-side device is important in the method for providing electric power by using a magnetic field. Accordingly, when the ground-side device is provided in a parking region, a vehicle driver parks a vehicle at a predetermined position by using the ground-side device as a reference.

Patent Literature 1 and Patent Literature 2 disclose devices for guiding a vehicle to a predetermined parking position. The device disclosed in Patent Literature 1 has a guide unit provided in a parking region. Then, the guide unit notifies a vehicle driver of a target position that is a vehicle parking position during electric power reception of the vehicle. The device disclosed in Patent Literature 2 has a camera mounted on the vehicle. The camera acquires a parking region image. This image includes a marker indicating a parking position. Then, in the device disclosed in Patent Literature 2, a vehicle-mounted display displays a composite image in which a target parking position is superimposed on the image.

CITATION LIST

Patent Literature

Patent Literature 1: Japanese Unexamined Patent Publication No. 2013-258881
Patent Literature 2: International Publication WO 2013/146139

SUMMARY OF INVENTION

Technical Problem

In the device disclosed in Patent Literature 1, it is necessary to satisfy the condition that the guide unit is provided at a position visible to the driver when the guide unit is to be integrated with an electric power source facility. In addition, in the device disclosed in Patent Literature 2, it is necessary to incorporate a predetermined system on the vehicle side in addition to a parking region-side facility such as the marker. Accordingly, desired in this technical field is a technique with which it is possible to easily construct a wireless power supply system allowing efficient electric power transmission and reception by providing a user with parking assistance information.

The present disclosure describes a coil device with which it is possible to more easily construct a wireless power supply system allowing efficient electric power transmission and reception by providing a user with parking assistance information.

Solution to Problem

One form of the present disclosure relates to a coil device including a ground-side coil disposed on a road surface where a vehicle parks or stops and wirelessly transmitting or receiving electric power to or from a vehicle-side coil mounted on the vehicle, an information acquisition unit disposed around the ground-side coil and acquiring information relating to a position of the vehicle relative to the ground-side coil, a display unit disposed at a position visible to a driver of the vehicle approaching the ground-side coil, and a control unit controlling a display mode on the display unit.

Effects of Invention

Described according to the present disclosure is a coil device with which it is possible to more easily construct a wireless power supply system allowing efficient electric power transmission and reception by providing a user with parking assistance information.

BRIEF DESCRIPTION OF DRAWINGS

FIG. 8 is a perspective view illustrating the configuration of a ground-side coil device according to yet another modification example.

Figure 1:
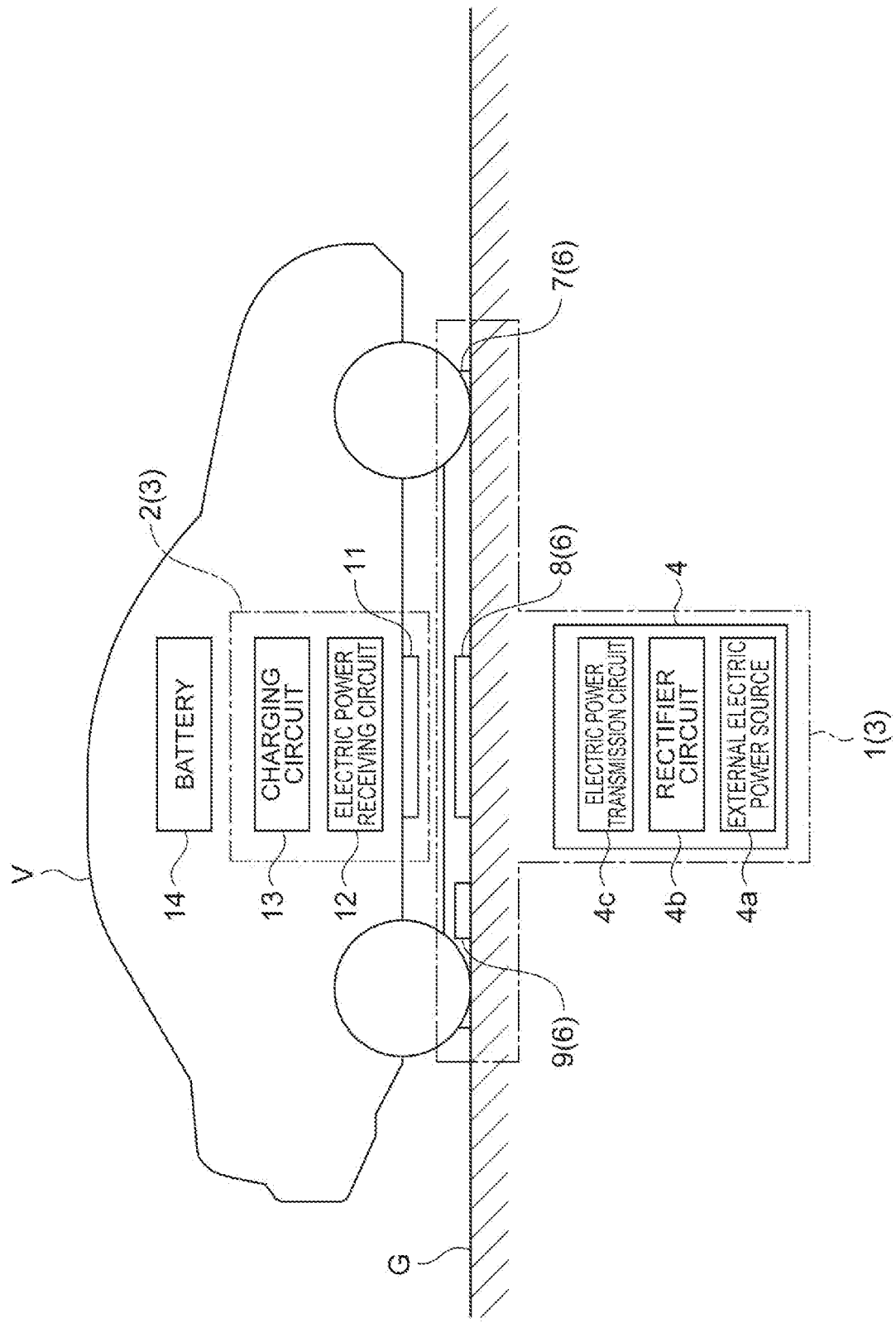
FIG. 1 is an overview illustrating the configuration of a wireless power supply system having the ground-side coil device of the present disclosure.

One form of the present disclosure relates to a coil device including a ground-side coil disposed on a road surface where a vehicle parks or stops and wirelessly transmitting or receiving electric power to or from a vehicle-side coil mounted on the vehicle, an information acquisition unit disposed around the ground-side coil and acquiring information relating to a position of the vehicle relative to the ground-side coil, a display unit disposed at a position visible to a driver of the vehicle approaching the ground-side coil, and a control unit controlling a display mode on the display unit.

The coil device is capable of acquiring information relating to the position of the vehicle with respect to the ground-side coil. According to the information relating to the position of the vehicle, it is possible to make a determination regarding the positional relationship between the vehicle-side coil and the ground-side coil based on the position of the vehicle at the point in time when the information is acquired. Accordingly, the coil device is capable of controlling the display mode in the control unit by using the determination result. The display mode can be shown on the display unit. The display unit is disposed at a position visible to the driver of the vehicle. As a result, parking position-related assistance information can be provided for the driver of the vehicle approaching the ground-side coil. Accordingly, no configuration for parking assistance needs to be added to the vehicle side. As a result, the coil device is capable of more easily constructing a system allowing efficient electric power transmission and reception by providing a user with parking assistance information.

In one form, the control unit may have a position acquisition unit obtaining the position of the vehicle relative to the ground-side coil by using the information relating to the position, a position determination unit determining whether the vehicle is present in a first region or a second region by using a result of the position acquisition unit, and a first display mode generation unit generating a display mode indicating that the vehicle is positioned in the first region to the driver in a case where the vehicle is present in the first region and generating a display mode indicating that the vehicle is positioned in the second region to the driver in a case where the vehicle is positioned in the second region. The first region may be a region where the vehicle-side coil is capable of reaching a position above of the ground-side coil in a case where the vehicle travels straight along a reference axis passing through the ground-side coil. The second region may be a region where the vehicle-side coil is incapable of reaching the position above of the ground-side coil in a case where the vehicle travels straight along the reference axis.

The control unit of the coil device acquires the position of the vehicle. Then, the control unit determines whether the position of the vehicle is positioned in the first region or the second region. In a case where the vehicle is positioned in the first region, for example, the vehicle-side coil is capable of reaching the position above of the ground-side coil as a result of straight traveling along the reference axis. Accordingly, the first display mode generation unit generates the display mode indicating that the vehicle is positioned in the first region. Then, the display unit displays the display mode. As a result, the coil device is capable of informing the driver that the position above of the ground-side coil can be reached as a result of straight traveling. Meanwhile, in a case where the vehicle is positioned in the second region, the vehicle-side coil is incapable of reaching the position above of the ground-side coil even if the vehicle travels straight along the reference axis. Accordingly, the first display mode generation unit generates the display mode indicating that the vehicle is positioned in the second region. Then, the display unit displays the display mode. As a result, the coil device is capable of informing the driver that the vehicle-side coil is incapable of reaching the position above of the ground-side coil even if the vehicle travels straight.

In one form, the control unit may further have a distance acquisition unit obtaining a correction distance for the vehicle to reach the first region in a case where the vehicle is positioned in the second region and a second display mode generation unit generating a display mode prompting the driver to operate the vehicle such that the correction distance decreases. According to this configuration, the coil device is capable of providing the driver of the vehicle with useful information for guiding the vehicle to an area above the ground-side coil.

In one form, the control unit may further have an angle acquisition unit obtaining a correction angle between a direction of the reference axis and a traveling direction of the vehicle by using the information relating to the position and a third display mode generation unit generating a display mode prompting the driver to operate the vehicle such that the correction angle decreases. According to this configuration, the coil device is capable of providing the driver of the vehicle with further useful information for guiding the vehicle to an area above the ground-side coil.

In one form, the display unit may have a screen unit provided on a main surface intersecting with a vertical direction in the ground-side coil and a projection unit projecting an image onto the screen unit. According to this configuration, the number of components present between the ground-side coil and the vehicle-side coil is reduced. Accordingly, it is possible to suppress a decline in the efficiency of transmission between the ground-side coil and the vehicle-side coil. Further, it is possible to suppress a decline in the efficiency of reception between the ground-side coil and the vehicle-side coil.

In one form, the screen unit may be inclined along a reference axis. According to this configuration, the area of the screen unit visible to the driver is increased. Accordingly, the coil device is capable of providing the parking assistance information for the driver of the vehicle in a more suitable manner.

In one form, the display unit may be a thin-film display unit formed of a non-metal material. According to this configuration, the number of components present between the ground-side coil and the vehicle-side coil is reduced. Accordingly, it is possible to suppress a decline in the efficiency of transmission between the ground-side coil and the vehicle-side coil. Further, it is possible to suppress a decline in the efficiency of reception between the ground-side coil and the vehicle-side coil.

In one form, the control unit may further have a fourth display mode generation unit generating a display mode indicating information provided for a user other than the driver. According to this configuration, the coil device is capable of providing the non-driver user with various types of information in a case where the vehicle is not parked or stopped above the ground-side coil.

Hereinafter, an embodiment for implementing a coil device of the present disclosure will be described in detail with reference to the accompanying drawings. In the description of the drawings, the same elements are denoted by the same reference numerals with redundant description omitted.

As illustrated in FIG. 1, a ground-side unit 1 and a vehicle-side unit 2 constitute a wireless power supply system 3. The wireless power supply system 3 supplies electric power from the ground-side unit 1 to the vehicle-side unit 2 by using magnetic coupling between a ground-side coil 8 and a vehicle-side coil 11. The electric power supply method of the wireless power supply system 3 is, for example, a magnetic resonance method or an electromagnetic induction method. The ground-side coil 8 transmits or receives electric power to or from the vehicle-side coil 11 mounted on a vehicle. The electric power transmission and the electric power reception are performed wirelessly. According to the description of the present disclosure, the ground-side coil 8 transmits electric power and the vehicle-side coil 11 receives electric power. It should be noted that the vehicle-side coil 11 may transmit electric power and the ground-side coil 8 may receive electric power.

The ground-side unit 1 wirelessly transmits electric power to the vehicle-side unit 2 of a vehicle V when the vehicle V is stopped at a predetermined position. The predetermined position is a position where an electromagnetic coupling circuit is formed. The ground-side unit 1 has an electric power source device 4 and a ground-side coil device 6.

The electric power source device 4 has an external electric power source 4a, a rectifier circuit 4b, and an electric power transmission circuit 4c. The external electric power source 4a supplies the rectifier circuit 4b with electric power necessary for generating electric power to be transmitted to the vehicle V. The external electric power source 4a supplies the rectifier circuit 4b with single-phase alternating current electric power such as a commercial alternating current electric power source. It should be noted that the electric power that the external electric power source 4a supplies to the rectifier circuit 4b is not limited to single-phase alternating current electric power. The electric power that the external electric power source 4a supplies to the rectifier circuit 4b may be three-phase alternating current electric power.

The rectifier circuit 4b rectifies the alternating current electric power that is supplied from the external electric power source 4a. In other words, the rectifier circuit 4b converts an alternating current into direct current electric power. The rectifier circuit 4b may include a power factor correction [PFC] function or a step-up/step-down function. It should be noted that the external electric power source 4a may be a direct current electric power source. Examples of the direct current electric power source include a fuel cell and a solar cell. In a case where the external electric power source 4a is a direct current electric power source, the rectifier circuit 4b may be omitted from the electric power source device 4. In addition, in a case where the external electric power source 4a is a direct current electric power source, a direct current conversion circuit (DC/DC converter) may be provided instead of the rectifier circuit 4b.

The electric power transmission circuit 4c converts the direct current electric power that is supplied from the rectifier circuit 4b into alternating current electric power having a high frequency. For example, the frequency of the alternating current electric power that is generated by the electric power transmission circuit 4c is higher than the frequency of the alternating current electric power that is generated by the external electric power source 4a. The alternating current electric power having a high frequency may be referred to as high-frequency electric power. The electric power transmission circuit 4c supplies alternating current electric power to the vehicle-side unit 2 via the ground-side coil device 6. By the alternating current electric power being supplied, wireless power supply is performed between the ground-side unit 1 and the vehicle-side unit 2. The electric power transmission circuit 4c may have a capacitor provided on the output side of an inverter circuit.

The ground-side coil device 6 has a housing 7, the ground-side coil 8, and a parking assistance unit 9. It should be noted that the ground-side coil device 6 will be described in detail later.

The vehicle-side unit 2 is mounted on the vehicle V. The vehicle-side unit 2 includes the vehicle-side coil 11, an electric power receiving circuit 12, and a charging circuit 13.

The vehicle-side coil 11 receives the electric power that is wirelessly supplied from the ground-side coil 8. This electric power is alternating current electric power. The vehicle-side coil 11 has the same configuration as the ground-side coil 8. The electric power receiving circuit 12 converts the alternating current electric power that is supplied from the vehicle-side coil 11 into direct current electric power. The electric power receiving circuit 12 supplies the direct current electric power to the charging circuit 13. The electric power receiving circuit 12 may have a capacitor. This capacitor and the vehicle-side coil 11 constitute an electric power reception side resonance circuit. The charging circuit 13 converts the electric power (direct current electric power) that is supplied from the electric power receiving circuit 12 into desired electric power. Subsequently, the charging circuit 13 supplies the desired electric power to a battery 14. The battery 14 is mounted on the vehicle V. The battery 14 is rechargeable. For example, a secondary battery such as a lithium-ion battery and a nickel-hydrogen battery may be used as the battery 14. The battery 14 supplies electric power to a traveling motor (not illustrated) or the like.

Hereinafter, the ground-side coil device 6 will be described in detail with reference to FIG. 2.

The housing 7 is a rectangular parallelepiped exhibiting a rectangular shape in plan view. The housing 7 accommodates elements constituting the ground-side coil device 6. Examples of the elements constituting the ground-side coil device 6 include the ground-side coil 8 and the parking assistance unit 9. The housing 7 has six surfaces. The six surfaces are a main surface 7a, a back surface 7b, a front surface 7f, a rear surface 7r, a right side surface 7c, and a left side surface 7d. The main surface 7a faces the bottom surface of the vehicle V. The back surface 7b is in contact with a road surface G. In addition, the back surface 7b may be embedded in the road surface G. The front surface 7f intersects with a reference axis L1 (described later). Further, the front surface 7f is capable of facing the vehicle V. The rear surface 7r intersects with the reference axis L1 (described later). Further, the rear surface 7r is provided on the side opposite to the front surface 7f. The main surface 7a, the front surface 7f, the right side surface 7c, and the left side surface 7d are capable of facing the vehicle V that approaches a parking region. In other words, the main surface 7a, the front surface 7f, the right side surface 7c, and the left side surface 7d are visible to a driver. Here, "visible" means a case where a driver directly views the main surface 7a, the front surface 7f, the right side surface 7c, and the left side surface 7d. Further, "visual recognition" may include a case where a driver indirectly views the main surface 7a, the front surface 7f, the right side surface 7c, and the left side surface 7d via a display. In other words, an image obtained by a camera mounted on the vehicle V is displayed on a display and the image includes at least one of the main surface 7a, the front surface 7f, the right side surface 7c, and the left side surface 7d. Meanwhile, the back surface 7b and the rear surface 7r do not face the vehicle V. In other words, the back surface 7b and the rear surface 7r cannot be visually recognized by a driver.

The ground-side coil 8 generates a magnetic field by using the alternating current electric power supplied from the electric power source device 4. The ground-side coil 8 is formed of a conducting wire wound in a substantially rectangular spiral shape in the same plane. The ground-side coil 8 generates an induced current. The ground-side coil 8 is a so-called circular coil. The circular coil is a coil in which a conducting wire is wound in a planar spiral shape around a winding axis. The planar spiral shape is the shape in which the conducting wire is wound from the outside to the inside or from the inside to the outside so as to surround the winding axis. The ground-side coil 8 may have an aspect in which a conducting wire is wound in the planar spiral shape. For example, the ground-side coil 8 may have a single layer or multiple layers. The ground-side coil 8 may have various shapes, such as rectangular, circular, and elliptical shapes, when viewed from the winding axis direction. A litz wire in which a plurality of mutually insulated conductor wires are twisted may be used as an example of the conducting wire. The conducting wire may be a single wire of copper or aluminum, a bus bar, or the like. It should be noted that the coil may be a solenoid coil.

The parking assistance unit 9 provides various types of information for the driver of the vehicle V. The information is for guiding the vehicle V to an area above the ground-side coil 8.

Figure 3:
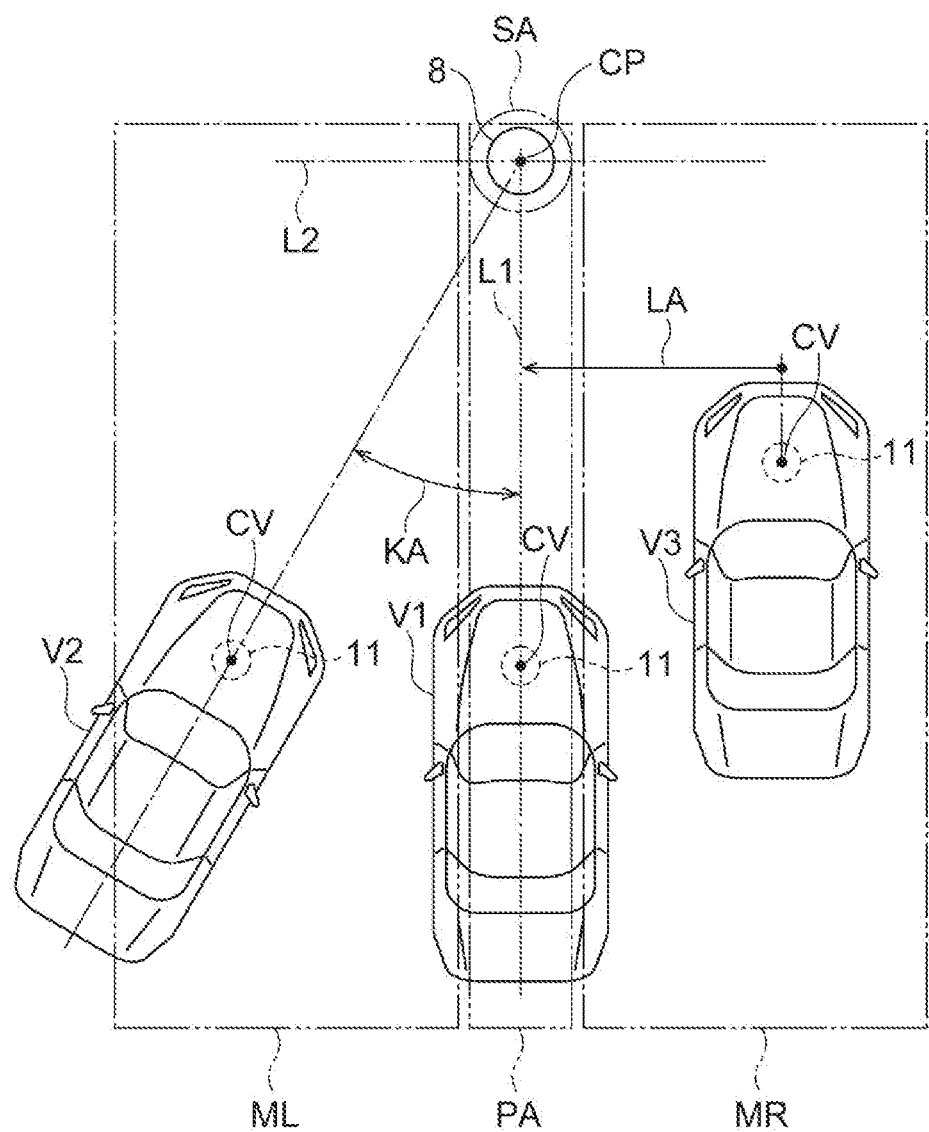
FIG. 3 is a plan view illustrating a permission area, a right impossibility area, and a left impossibility area.

FIG. 3 illustrates a state where the vehicle V approaches the parking region to be supplied with electric power. In a case where the vehicle V is supplied with electric power, the allowable range of the stop position of the vehicle V is determined in advance. The allowable range is determined based on the position of the vehicle-side coil 11 relative to the ground-side coil 8. When the vehicle-side coil 11 is deviated with respect to the ground-side coil 8, the efficiency of transmission from the ground-side coil 8 to the vehicle-side coil 11 declines. Accordingly, an allowable relative position of the vehicle-side coil 11 with respect to the ground-side coil 8 is set for a preset transmission efficiency level to be ensured. For example, 10 centimeters or less may be defined as the allowable deviation distance from a center position CP of the ground-side coil 8 to the center position of the vehicle-side coil 11. The region where this deviation is allowed will be referred to as "electric power supply area SA" in the following description. In other words, the electric power supply area SA may have the shape of a circle having a diameter of 10 cm about the center position CP of the ground-side coil 8. The driver drives the vehicle V such that a center CV of the vehicle-side coil 11 is positioned in the electric power supply area SA.

A permission area PA (first region), a right impossibility area MR (second region), and a left impossibility area ML (second region) are set based on the electric power supply area SA. The permission area PA is a range in which the electric power supply area SA can be reached in a case where the vehicle V travels straight along the reference axis L1. The right impossibility area MR and the left impossibility area ML are ranges in which the electric power supply area SA cannot be reached in a case where the vehicle V travels straight along the reference axis L1. The reference axis L1 is an axis passing through the center position CP of the ground-side coil 8. The reference axis L1 is substantially parallel to, for example, the white line that indicates the parking region. A deviation axis L2 is defined as an axis orthogonal to the reference axis L1.

A vehicle V1 positioned in the permission area PA is assumed as an example. The vehicle V1 is capable of stopping in the electric power supply area SA by traveling straight along the reference axis L1. Meanwhile, a vehicle V2 positioned in the right impossibility area MR is assumed. The vehicle V2 is incapable of stopping in the electric power supply area SA even if the vehicle V2 travels straight along the reference axis L1.

Accordingly, the driver can perform an operation for reaching the permission area PA in accordance with the position of the vehicle V once the driver is informed of whether the vehicle V is positioned in the permission area PA, the right impossibility area MR, or the left impossibility area ML. The parking assistance unit 9 provides the driver with assistance information prompting the operation for reaching the permission area PA.

Figure 2:
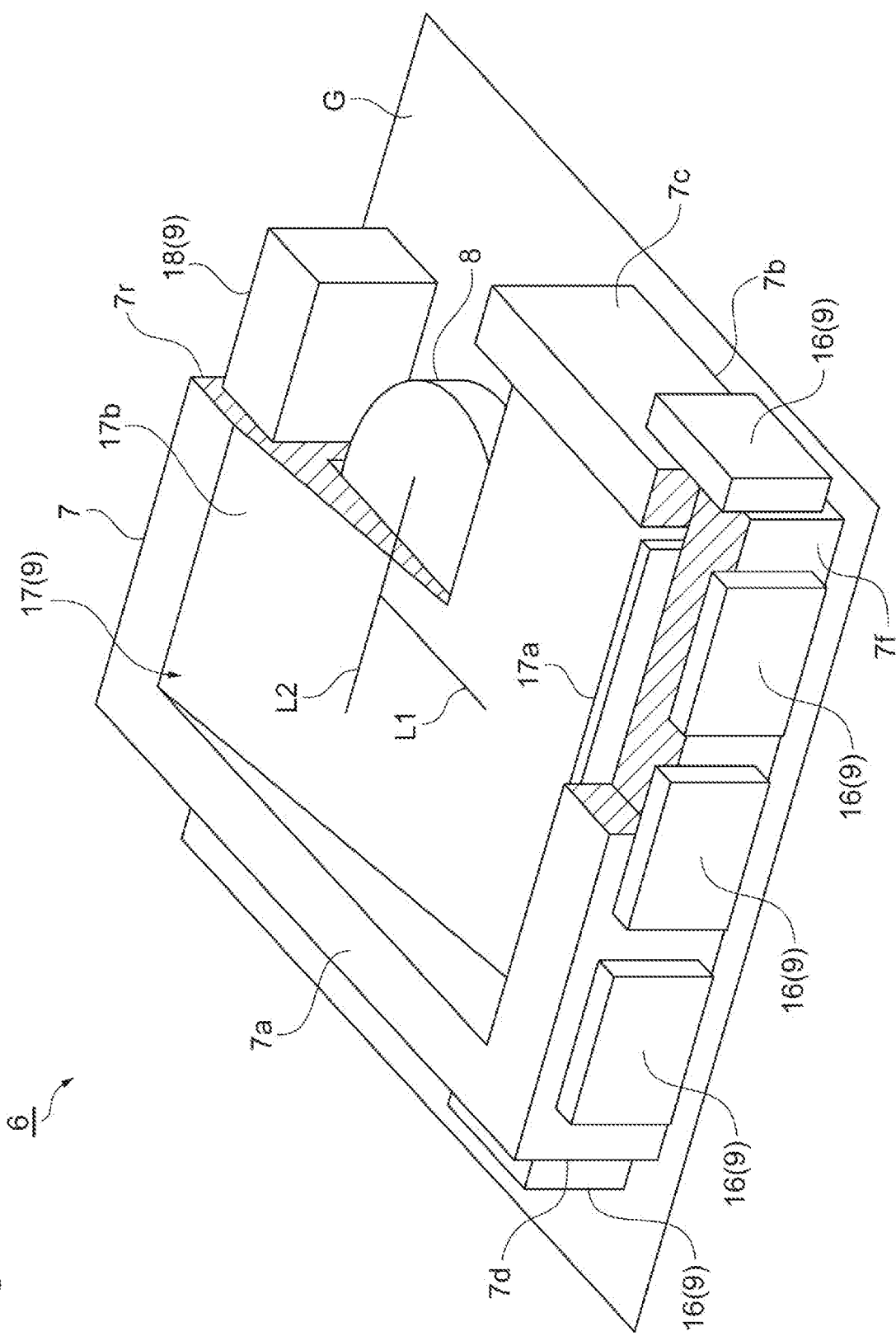
FIG. 2 is a perspective view illustrating a configuration with the ground-side coil device cut out in part.

As illustrated in FIG. 2, the parking assistance unit 9 has a position detection sensor 16 (information acquisition unit), a display unit 17, and a control unit 18.

The position detection sensor 16 acquires information for detecting the relative positions of the ground-side unit 1 and the vehicle V. The position detection sensor 16 is connected to the control unit 18. The position detection sensor 16 transmits the acquired information to the control unit 18. The position detection sensor 16 is disposed on the front surface 7f, the right side surface 7c, and the left side surface 7d of the housing 7. The front surface 7f, the right side surface 7c, and the left side surface 7d are capable of facing the vehicle V. Accordingly, when the vehicle V that approaches the parking region is present, the vehicle V can be reliably detected by the position detection sensor 16 disposed on any of the front surface 7f, the right side surface 7c, and the left side surface 7d.

The position detection sensor 16 is a camera as an example. In a case where the position detection sensor 16 is the camera, the information for relative position detection is image data including the vehicle V. The position detection sensor 16 may be a contactless distance measuring device as another example. The contactless distance measuring device emits an output wave such as laser light, a sound wave, and a microwave (magnetic field). Then, the contactless distance measuring device detects a reflected wave reflected by the vehicle V. Accordingly, in a case where the position detection sensor 16 is the contactless distance measuring device, the information for relative position detection may include the type of the output wave, the direction of emission of the output wave, and the time from output wave emission to reflected wave capturing. It should be noted that the position detection sensor 16 is not limited to cameras and contactless distance meters. Various devices capable of acquiring information for detecting a position relative to the vehicle V may be used for the position detection sensor 16. For example, the position detection sensor 16 may include both a camera and a contactless distance meter.

The display unit 17 notifies the driver of various types of information. Various configurations may be adopted insofar as the display unit 17 is configured to be capable of displaying image information. For example, the display unit 17 may adopt a projector method. The display unit 17 that adopts the projector method has a projector 17a (projection unit) and a screen 17b (screen unit). The projector 17a is disposed on the front surface 7f side of the housing 7. The screen 17b is provided on the main surface 7a of the housing 7. The screen 17b is inclined with respect to the reference axis L1. Specifically, the position of the side portion of the screen 17b that is on the rear surface 7r side is higher than the position of the side portion of the screen 17b that is on the front surface 7f side. According to this configuration, the area of projection with respect to the driver of a vehicle approaching from the front surface 7f side increases. As a result, it is possible to enhance visibility.

Figure 4C:
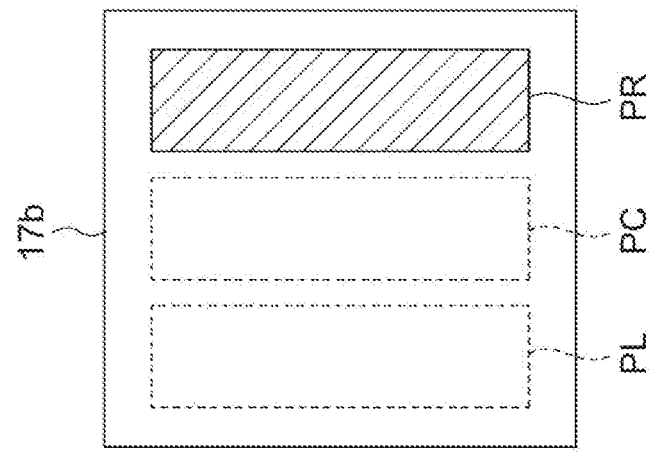
FIGS. 4A-4C are illustrations of several display patterns shown on a screen.
Figure 4B:
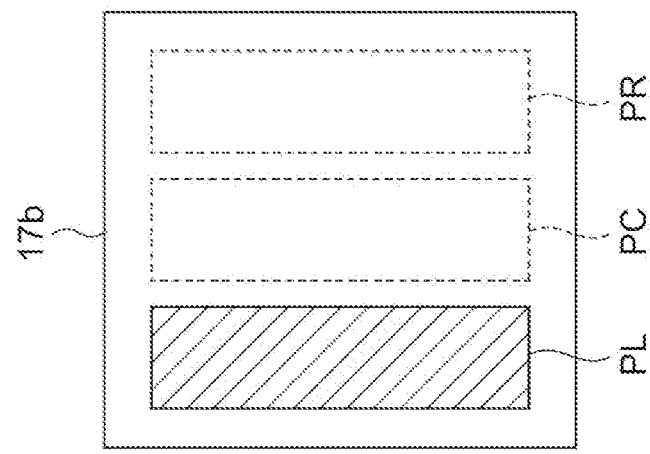
Figure 4A:
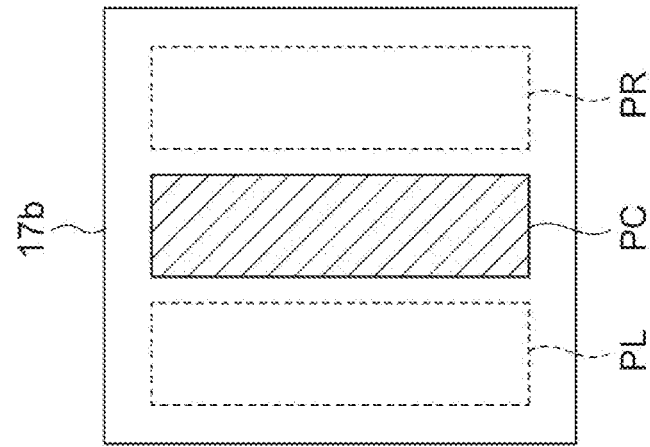

As illustrated in FIGS. 4A, 4B, and 4C, the screen 17b displays a permission pattern (FIG. 4A), a left impossibility pattern (FIG. 4B), and a right impossibility pattern (FIG. 4C) as display modes. Each pattern is indicated by a predetermined image being displayed in a left region PL, a middle region PC, and a right region PR, which are set on the screen 17b. The left region PL, the middle region PC, and the right region PR extend along the reference axis L1 and are arranged in this order along the deviation axis L2.

The permission pattern indicates that the position of the vehicle V is in the permission area PA (see the vehicle V1 in FIG. 3). As illustrated in FIG. 4A, the display unit 17 displays a predetermined image in the middle region PC of the screen 17b as the permission pattern. The middle region PC includes the reference axis L1 on the screen 17b. At this time, the display unit 17 may display no image in the right region PR and the left region PL of the screen 17b. In addition, the display unit 17 may display an image that is less conspicuous than the image displayed in the middle region PC in the right region PR and the left region PL of the screen 17b.

The left impossibility pattern indicates that the position of the vehicle V is in the left impossibility area ML (see the vehicle V2 in FIG. 3). As illustrated in FIG. 4B, the display unit 17 displays a predetermined image in the left region PL of the screen 17b as the left impossibility pattern. The left region PL is set on the left side of the middle region PC and does not include the reference axis L1 on the screen 17b. At this time, the display unit 17 may display no image in the middle region PC and the right region PR of the screen 17b. In addition, the display unit 17 may display an image that is less conspicuous than the image displayed in the left region PL in the middle region PC and the right region PR of the screen 17b.

The right impossibility pattern indicates that the position of the vehicle V is in the right impossibility area MR (see a vehicle V3 in FIG. 3). As illustrated in FIG. 4C, the display unit 17 displays a predetermined image in the right region PR of the screen 17b as the right impossibility pattern. The right region PR is set on the right side of the middle region PC and does not include the reference axis L1 on the screen 17b. At this time, the display unit 17 may display no image in the middle region PC and the left region PL of the screen 17b. In addition, the display unit 17 may display an image that is less conspicuous than the image displayed in the right region PR in the middle region PC and the left region PL of the screen 17b.

These display patterns are not particularly limited insofar as the meanings of the display patterns are easily understood by a driver. As described above, the screen 17b may display an image. In addition, the display unit 17 may make one of the regions more conspicuous than the others simply by irradiating the region with light. In addition, the display unit 17 may display an image in a continuous manner, turn on light, or blink.

Figure 5:
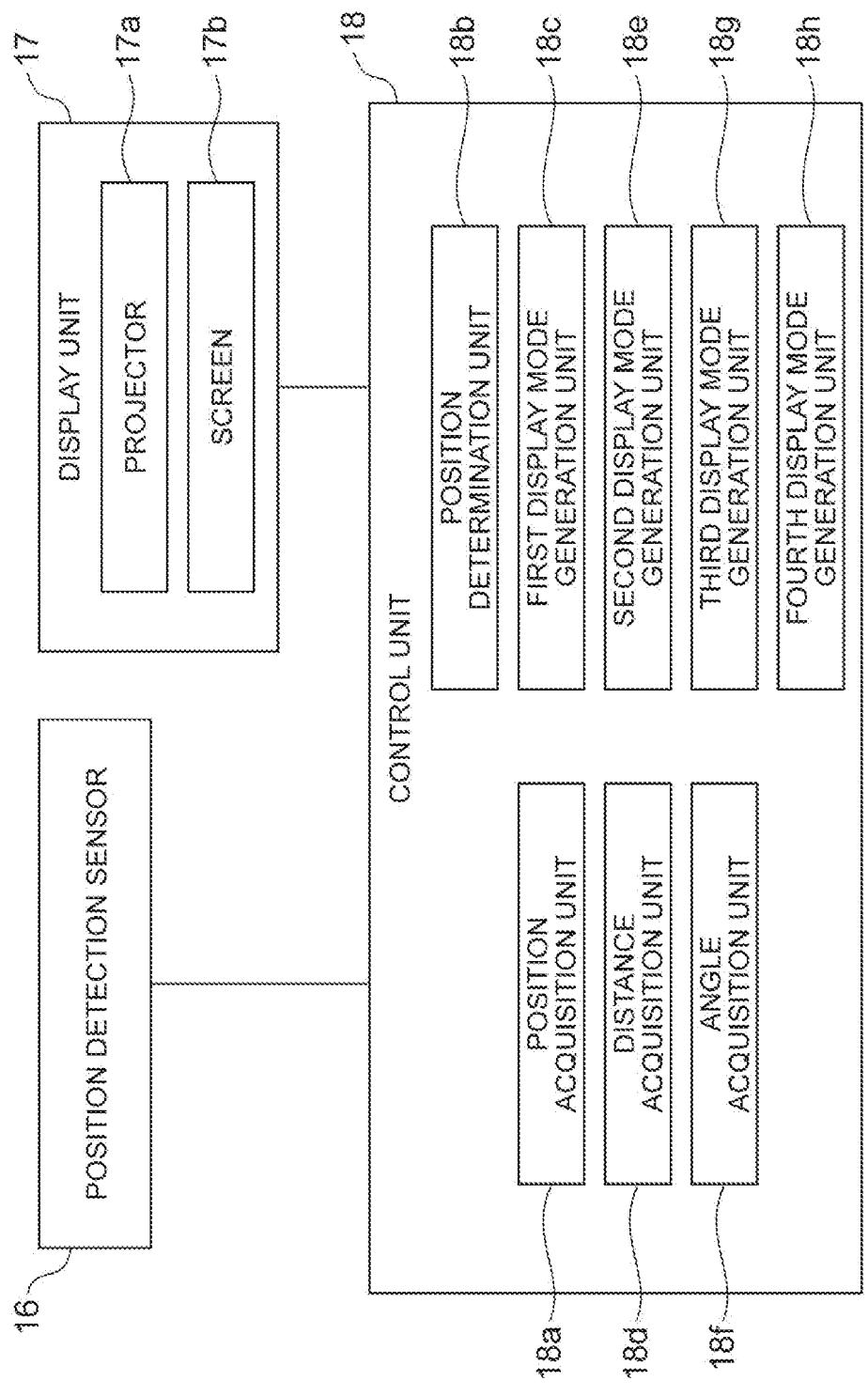
FIG. 5 is a block diagram illustrating the configuration of a control unit.

As illustrated in FIG. 5, the control unit 18 controls the display mode of the display unit 17 by using data output from the position detection sensor 16. In other words, the control unit 18 changes the display mode of the display unit 17 in accordance with the state of the vehicle V.

The control unit 18, which is an electronic control unit, is a so-called computer. The control unit 18 includes a central processing unit [CPU], a read only memory [ROM], a random access memory [RANI], and so on. As illustrated in FIG. 5, the control unit 18 includes a plurality of functional components. The control unit 18 operates the computer as these functional components by executing a pre-recorded program.

The control unit 18 has a position acquisition unit 18a, a position determination unit 18b, and a first display mode generation unit 18c.

The position acquisition unit 18a obtains the relative position of the vehicle V by using data output from the position detection sensor 16. For example, when the position detection sensor 16 is a camera, the position acquisition unit 18a obtains the difference between a camera image and a plurality of types of vehicle appearance images recorded in advance. Then, the relative position of the vehicle V may be obtained based on the difference. In addition, when the position detection sensor 16 is a camera, the position acquisition unit 18a obtains the difference between pre-recorded license plate shape information and license plate shape information obtained from a camera image. Then, the relative position of the vehicle V may be obtained based on the difference. Further, when the position detection sensor 16 is a camera, the position acquisition unit 18a obtains the difference between pre-recorded feature point information relating to the vehicle V and feature point information obtained from a camera image. The feature point information is, for example, information relating to paint or an uneven marker plate. Then, the relative position of the vehicle V may be obtained based on the difference.

Note that, in a case where the position detection sensor 16 is a contactless distance meter, the relative position of the vehicle V may be obtained by means of, for example, the type of the output wave, the direction of emission of the output wave, and the time from output wave emission to reflected wave capturing. Further, in a case where the position detection sensor 16 is a complex of a camera and a contactless distance meter, the relative position of the vehicle V may be obtained by various types of information being combined. In this case, it is possible to obtain more detailed information relating to the relative position.

The position determination unit 18b determines whether the position of the vehicle V is positioned in the permission area PA, the right impossibility area MR, or the left impossibility area ML by using the calculation result of the position acquisition unit 18a. Information defining the permission area PA, the right impossibility area MR, and the left impossibility area ML is recorded in advance in the control unit 18. This information is shown as two-dimensional coordinates having the center position CP of the ground-side coil 8 as an origin, the reference axis L1 as a Y axis, and the deviation axis L2 as an X axis. The calculation result of the position acquisition unit 18a is coordinate information in which the center position CP of the ground-side coil 8 is a reference. Accordingly, it is possible to determine whether the coordinates that indicate the position of the vehicle V are positioned in the permission area PA, the right impossibility area MR, or the left impossibility area ML.

The first display mode generation unit 18c determines the display mode of the display unit 17 based on the result of the position determination unit 18b. For example, when the position determination unit 18b determines that the position of the vehicle V is in the permission area PA, the first display mode generation unit 18c causes the permission pattern to be displayed on the screen 17b by controlling the display unit 17. Meanwhile, when the position determination unit 18b determines that the position of the vehicle V is in the right impossibility area MR, the first display mode generation unit 18c causes the right impossibility pattern to be displayed on the screen 17b by controlling the display unit 17. Further, when the position determination unit 18b determines that the position of the vehicle V is in the left impossibility area ML, the first display mode generation unit 18c causes the left impossibility pattern to be displayed on the screen 17b by controlling the display unit 17.

The control unit 18 is provided with a distance acquisition unit 18d, a second display mode generation unit 18e, an angle acquisition unit 18f, and a third display mode generation unit 18g as well as the position acquisition unit 18a, the position determination unit 18b, and the first display mode generation unit 18c.

It should be noted that the control unit 18 may be provided with the distance acquisition unit 18d, the second display mode generation unit 18e, the angle acquisition unit 18f, and the third display mode generation unit 18g as necessary. For example, the control unit 18 may be provided with at least the position acquisition unit 18a, the position determination unit 18b, and the first display mode generation unit 18c. In addition, the control unit 18 may be provided with the distance acquisition unit 18d and the second display mode generation unit 18e in addition to the position acquisition unit 18a, the position determination unit 18b, and the first display mode generation unit 18c. In addition, the control unit 18 may be provided with the angle acquisition unit 18f and the third display mode generation unit 18g in addition to the position acquisition unit 18a, the position determination unit 18b, and the first display mode generation unit 18c.

The distance acquisition unit 18d obtains a correction distance LA (see FIG. 3) for the vehicle V3 to reach the permission area PA in a case where, for example, the right impossibility area MR is the position of the vehicle V3. Then, the distance acquisition unit 18d outputs information relating to the correction distance LA to the second display mode generation unit 18e. Here, the correction distance LA is the distance between the vehicle V3 and the ground-side unit 1 that is along the deviation axis (X axis) direction. More specifically, the correction distance LA is the deviation axis-direction (X axis-direction) distance between the center position CP of the vehicle-side coil 11 and the center position CP of the ground-side coil 8. The calculation result in the position acquisition unit 18a is two-dimensional coordinates having the center position CP of the ground-side coil 8 as an origin. Then, the correction distance LA corresponds to the X value in the two-dimensional coordinates. It should be noted that the distance acquisition unit 18d may calculate the linear distance at which the center position CP of the vehicle-side coil 11 and the center position CP of the ground-side coil 8 are interconnected. Even in this case, the linear distance can be obtained by the Pythagorean theorem by means of the two-dimensional coordinates having the center position CP of the ground-side coil 8 as an origin.

The second display mode generation unit 18e controls the display mode that is displayed on the display unit 17 by using the information relating to the correction distance LA. For example, when the position of the vehicle V3 is in the right impossibility area MR, the first display mode generation unit 18c causes the display unit 17 to display the right impossibility pattern. Next, the second display mode generation unit 18e changes the display mode of the right impossibility pattern by using the information relating to the correction distance LA. In a case where the correction distance LA is large, for example, the blinking speed of the right impossibility pattern may be increased. In addition, in a case where the correction distance LA is small, the blinking speed of the right impossibility pattern displayed in the right region PR may be reduced. Then, the blinking speed of the right impossibility pattern decreases and the lighting time of the right region PR shortens as the vehicle V3 approaches the permission area PA. According to this display mode, it is possible to notify a driver that the vehicle V3 approaches the permission area PA. It should be noted that the relationship between the correction distance LA and the display mode is not limited to the example described above and various display modes may be adopted.

The angle acquisition unit 18f obtains, for example, a correction angle KA (see FIG. 3) for the angle that is formed by the traveling direction of the vehicle V2 and the reference axis L1 to become close to zero. Then the angle acquisition unit 18f outputs information relating to the correction angle KA to the third display mode generation unit 18g. The traveling direction of the vehicle V2 is obtained by means of the position of the vehicle V2 at a first timing and the position of the vehicle V2 at a second timing, which is a predetermined time later than the first timing.

The third display mode generation unit 18g controls the display mode on the display unit 17 by using the information relating to the correction angle KA. For example, the third display mode generation unit 18g may notify a driver of the magnitude of an angle deviation by means of the blinking speed of the left impossibility pattern as is the case with the second display mode generation unit 18e.

The ground-side coil device 6 is capable of acquiring information relating to the position of the vehicle V that approaches the ground-side coil 8. Accordingly, it is possible to make a determination regarding the positional relationship between the vehicle-side coil 11 and the ground-side coil 8 based on the vehicle position at the point in time when the information relating to the position is acquired. Accordingly, the control unit 18 of the ground-side coil device 6 is capable of controlling the display mode by using the determination result. This display mode can be shown on the display unit 17. The display unit 17 is disposed at a position visible to a driver. As a result, the ground-side coil device 6 is capable of providing parking position-related assistance information for the driver of the vehicle V approaching the ground-side coil 8. Accordingly, no configuration for parking assistance needs to be added to the vehicle side of the ground-side coil device 6. As a result, the ground-side coil device 6 is capable of more easily constructing the wireless power supply system 3 allowing efficient electric power transmission and reception by providing a driver with parking assistance information.

According to this form, in the ground-side coil device 6, the control unit 18 acquires the vehicle position. Then, the ground-side coil device 6 determines whether the vehicle position is positioned in the permission area PA, the right impossibility area MR, or the left impossibility area ML. In a case where the vehicle V is positioned in the permission area PA, the vehicle-side coil 11 of the vehicle V is capable of reaching the position above of the ground-side coil 8 as a result of straight traveling along the reference axis L1. Accordingly, the first display mode generation unit 18c generates the permission pattern indicating that the vehicle V is positioned in the permission area PA to the driver. The display unit 17 displays the permission pattern. Then, it is possible to inform the driver that the vehicle-side coil 11 is capable of reaching the position above of the ground-side coil 8 as a result of straight traveling. Meanwhile, in a case where the vehicle V is positioned in the right impossibility area MR or the left impossibility area ML, the vehicle-side coil 11 is incapable of reaching the position above of the ground-side coil 8 even if the vehicle V travels straight along the reference axis L1. Accordingly, the first display mode generation unit 18c generates the right impossibility pattern or the left impossibility pattern indicating that the vehicle V is positioned in the right impossibility area MR or the left impossibility area ML to the driver. The display unit 17 displays the pattern. Then, it is possible to inform the driver that the vehicle-side coil 11 is incapable of reaching the position above of the ground-side coil 8 even if the vehicle V travels straight. Here, the vehicle-side coil 11 being capable of reaching the position above of the ground-side coil 8 means being capable of reaching a positional relationship in which a desired wireless power supply performance is realizable. The desired wireless power supply performance is, for example, the realization of a desired electric power supply amount or more or the realization of a desired electric power supply efficiency level or more. In other words, the position of the vehicle-side coil 11 that is determined to have reached the position above of the ground-side coil 8 is defined within a predetermined range.

The ground-side coil device of the present disclosure has been described in detail based on the embodiment. However, the ground-side coil device of the present disclosure is not limited to the embodiment described above. The ground-side coil device of the present disclosure can be modified in various ways within the gist of the present disclosure.

Figure 6:
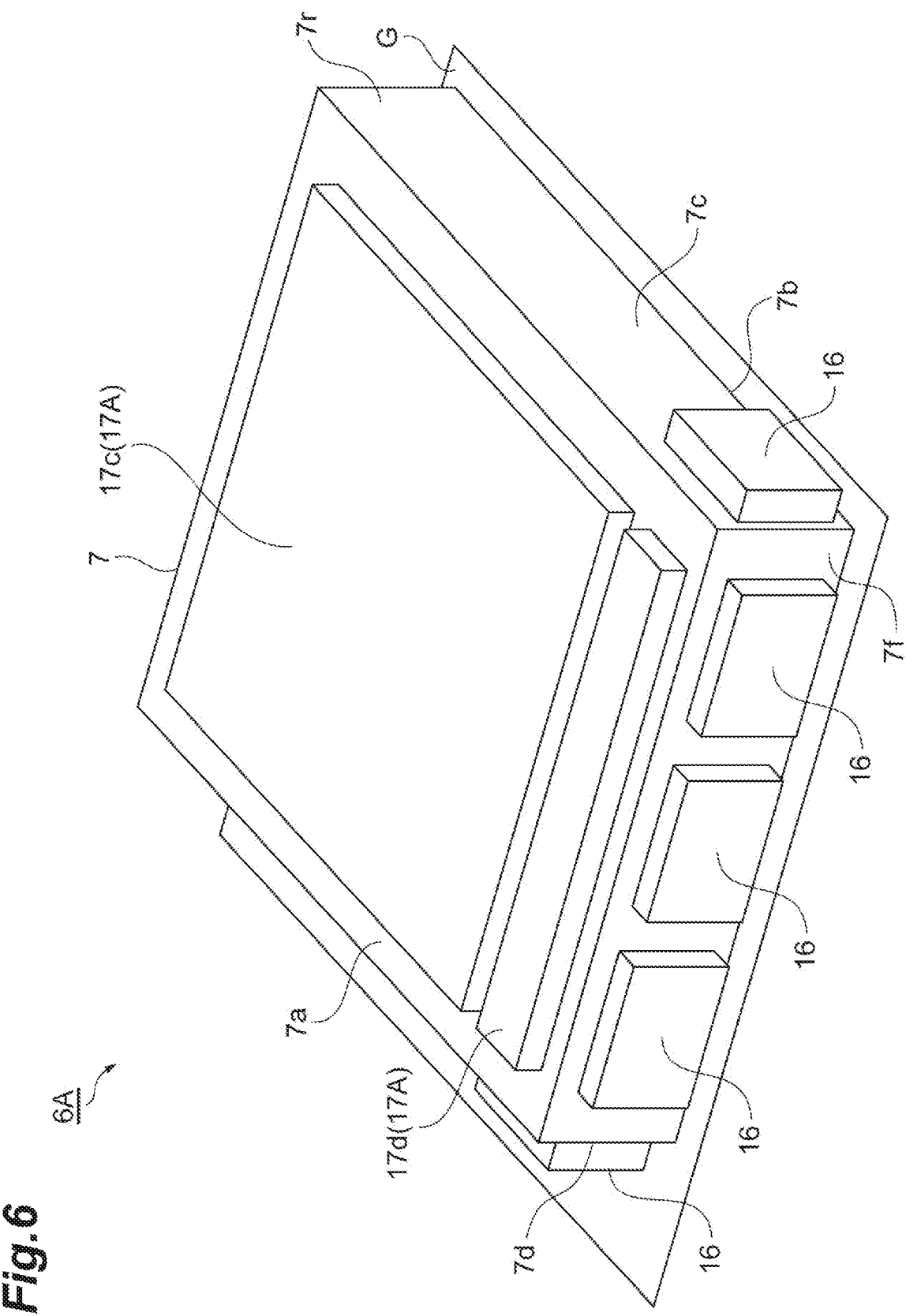
FIG. 6 is a perspective view illustrating the configuration of a ground-side coil device according to a modification example.

For example, a display unit 17A of a ground-side coil device 6A according to a modification example may have a light guide plate 17c and a light source 17d as illustrated in FIG. 6. The light guide plate 17c is a transparent plate member made of resin or glass. The light guide plate 17c has a predetermined pattern formed as a result of surface scraping or the like. Light is emitted from the light source 17d and the end surface of the light guide plate 17c is provided with the light. Then, the pattern can be made conspicuous in accordance with the color of the provided light. Further, the display unit may have a printed light panel and a light source. Also in this case, the pattern that is formed on the surface of the printed light panel can be made conspicuous by light being emitted from the light source and the end surface of the printed light panel being provided with the light. In addition, as the display unit, a diffusion plate may be used instead of the light guide plate. With the diffusion plate, it is possible to diffuse the light provided from the light source and improve visibility.

Figure 7:
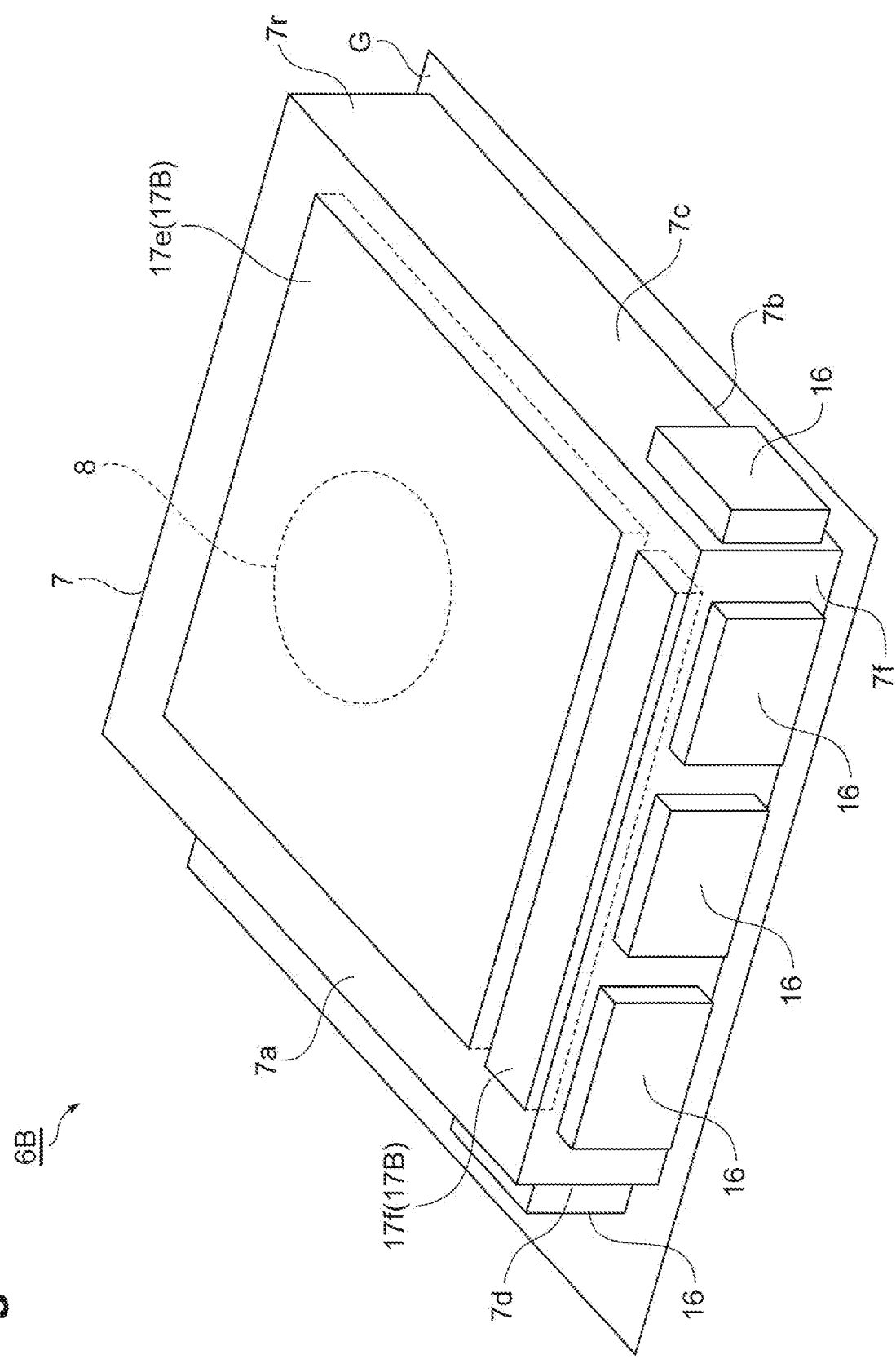
FIG. 7 is a perspective view illustrating the configuration of a ground-side coil device according to another modification example.

For example, the method of the display unit is not limited to the projector method. A display unit 17B of a ground-side coil device 6B according to a modification example may adopt, for example, a display method as illustrated in FIG. 7. The display unit 17B adopting the display method has a display 17e (thin-film display unit) and a signal processing microcomputer 17f. An organic EL method or a liquid crystal method may be adopted as the method of the display 17e. It should be noted that the display 17e and the signal processing microcomputer 17f are configured not to affect the magnetic field that is formed by the ground-side coil 8. In other words, such pattern arrangement is adapted that won't affect the magnetic field formed by the ground-side coil 8 in a case where the display 17e is disposed on the ground-side coil 8 as well. In addition, the signal processing microcomputer 17f is disposed at a position that does not vertically overlap the ground-side coil 8. Further, the display 17e may be a sheet-shaped display formed of a flexible non-metal material. With the sheet-shaped display, it is possible to sufficiently resist an external force even in a situation in which a tire of the vehicle V rides on the housing 7. With this configuration, a moving image can be displayed on the display unit 17B. With the display unit 17B that is a liquid crystal display, it is possible to indicate information relating to the state of the vehicle V by means of a color pattern. For example, the magnitude of the correction distance or the magnitude of the correction angle can be indicated by means of a gradation that continuously changes from a first color to a second color. In addition, the control unit 18 may cause a specific numerical value of the correction distance or the correction angle to be displayed on the display 17e. In addition, the display unit 17B may cause a moving image in which information relating to the state of the vehicle V is schematically shown to be displayed on the display 17e.

For example, a display unit 17C of a ground-side coil device 6C according to a modification example may have a screen 17g and a projector 17h as illustrated in FIG. 8. The screen 17g is not inclined whereas the screen 17b according to the embodiment is inclined. The screen 17g may be configured on the main surface 7a.

The ground-side unit 1 may be installed at a fixed-route bus stop or a taxi stop as well as in the parking region. In this case, the vehicle V can be provided with electric power during passenger entry and exit and passenger waiting. The control unit 18 may further include a fourth display mode generation unit 18h, which generates a display mode indicating information provided for a non-driver user. Examples of the non-driver user include a passenger waiting for a fixed-route bus at a stop. No fixed-route bus is present on the ground-side unit 1 during the period when the user waits for the fixed-route bus. Accordingly, the user can visually recognize the display unit 17. Accordingly, during this period, the fourth display mode generation unit 18h may cause the display unit 17 to display, for example, information relating to the current position of the fixed-route bus, alert information relating to the ground-side unit 1, and advertising information. Further, the control unit 18 may cause the display unit 17 to display various types of information even in a case where the fixed-route bus stops at the stop. For example, in a case where the fixed-route bus stops at the stop, the control unit 18 may cause the display unit 17 to display the character information of "charging" that indicates ongoing electric power supply or may cause the display unit 17 to display the state of charging of the fixed-route bus (such as "at least 80% charged").

REFERENCE SIGNS LIST

1: ground-side unit, 2: vehicle-side unit, 3: wireless power supply system, 4: electric power source device, 4a: external electric power source, 4b: rectifier circuit, 4c: electric power transmission circuit, 6, 6A, 6B, 6C: ground-side coil device, 7: housing, 7a: main surface, 7b: back surface, 7c: right side surface, 7d: left side surface, 7f: front surface, 7r: rear surface, 8: ground-side coil, 9: parking assistance unit, 11: vehicle-side coil, 12: electric power receiving circuit, 13: charging circuit, 14: battery, 16: position detection sensor (information acquisition unit), 17, 17A, 17B, 17C: display unit, 17a, 17h: projector (projection unit), 17b, 17g: screen, 17c: light guide plate, 17d: light source, 17e: display, 17f: signal processing microcomputer, 18: control unit, 18a: position acquisition unit, 18b: position determination unit, 18c: first display mode generation unit, 18d: distance acquisition unit, 18e: second display mode generation unit, 18f: angle acquisition unit, 18g: third display mode generation unit, 18h: fourth display mode generation unit, CP: center position, CV: center, G: road surface, KA: correction angle, L1: reference axis, L2: axis, LA: correction distance, MR: right impossibility area, ML: left impossibility area, PA: permission area, PL: left region, PC: middle region, PR: right region, SA: electric power supply area, V, V1, V2, V3: vehicle.

The invention claimed is:

1. A coil device comprising: a housing being a rectangular cuboid, and having a housing back surface contacting a ground surface and a housing main surface on a side opposite the back surface; a ground-side coil accommodated in the housing and configured to wirelessly transmit or receive electric power to or from a vehicle-side coil mounted on a vehicle; an information acquisition unit disposed around the ground-side coil and acquiring information relating to a position of the vehicle relative to the ground-side coil;

a display unit provided on the housing main surface and disposed at a position visible to a driver of the vehicle approaching the ground-side coil; and at least one processor controlling a display mode on the display unit, wherein the ground-side coil is disposed between the housing back surface and the housing main surface provided with the display unit and wherein the housing further comprises: a housing front surface intersecting a reference axis passing through a ground-side coil; and a housing right side surface disposed to a right side with respect to the housing, when viewed from the ground-side coil along the reference axis, and a housing left side surface disposed to a left side with respect to the housing, when viewed from the ground-side coil along the reference axis; wherein: the information acquisition unit has a first sensor disposed on the housing front surface, a second sensor disposed on the housing right side surface, and a third sensor disposed on the housing left side surface.

2. The coil device according to claim 1, wherein the at least one processor is configured to:

obtain the position of the vehicle relative to the ground-side coil by using the information relating to the position;

determine whether the vehicle is present in a first region or a second region by using a relative position of the vehicle;

wherein:

the coil device generates a display mode indicating that the vehicle is positioned in the first region to the driver in a case where the vehicle is present in the first region and generating a display mode indicating that the vehicle is positioned in the second region to the driver in a case where the vehicle is positioned in the second region, the first region is a region where the vehicle-side coil is capable of reaching a position above the ground-side coil in a case where the vehicle travels straight along a reference axis passing through the ground-side coil, and the second region is a region where the vehicle-side coil is incapable of reaching the position above of the ground-side coil in a case where the vehicle travels straight along the reference axis.

3. The coil device according to claim 2, wherein the at least one processor is further configured to:

obtain a correction distance for the vehicle to reach the first region in a case where the vehicle is positioned in the second region; and generate a display mode prompting the driver to operate the vehicle such that the correction distance decreases.

4. The coil device according to claim 2, wherein the at least one processor is further configured to:

obtain correction angle between a direction of the reference axis and a traveling direction of the vehicle by using the information relating to the position; and generate display mode prompting the driver to operate the vehicle such that the correction angle decreases.

5. The coil device according to claim 1, wherein the display unit has a screen unit provided on a main surface of the housing, the main surface intersecting with a vertical direction in the ground-side coil and a projection unit projecting an image onto the screen unit.

6. The coil device according to claim 5, wherein the screen unit is inclined along a reference axis passing through the ground-side coil.

7. The coil device according to claim 1, wherein the display unit is a thin-film display unit formed of a non-metal material.

8. The coil device according to claim 1, wherein the at least one processor is further configured to generate a display mode indicating information provided for a user other than the driver.

9. The coil device according to claim 3, wherein the at least one processor is further configured to generate a display mode indicating information provided for a user other than the driver.

10. The coil device according to claim 1, wherein the processor is accommodated in the housing.

11. The coil device according to claim 1, wherein the ground-side coil is disposed between the housing right side surface and the housing left side surface.

12. The coil device according to claim 1, wherein: the first sensor is disposed to face the vehicle present in a permission area, the second sensor is disposed to face the vehicle present in a right impossibility area configured to a right side with respect to the permission area, when viewed from the ground-side coil along the reference axis, and the third sensor disposed to face the vehicle present in a left impossibility area configured to a left side with respect to the permission area, when viewed from the ground-side coil along the reference axis.

* * * * *